(12) United States Patent
Sparks et al.

(10) Patent No.: US 6,298,385 B1
(45) Date of Patent: Oct. 2, 2001

(54) METHOD AND APPARATUS FOR OPTIMIZING PLAYBACK OF MEDIA FILES OVER A DATA NETWORK

(75) Inventors: Randall B. Sparks, Lafayette; C. Reid Turner; Craig I. Weich, both of Boulder; Arnold M. Lund, Louisville, all of CO (US)

(73) Assignee: Qwest Communications Int'l., Inc., Denver, CO (US)

( * ) Notice: Subject to any disclaimer, the term of this patent is extended or adjusted under 35 U.S.C. 154(b) by 0 days.

(21) Appl. No.: 09/181,954

(22) Filed: Oct. 28, 1998

(51) Int. Cl.[7] .................................................. G06F 13/00
(52) U.S. Cl. ............................................................ 709/233
(58) Field of Search .................................... 709/203, 231, 709/233, 247; 707/104

(56) References Cited

U.S. PATENT DOCUMENTS

| | | | |
|---|---|---|---|
| 5,822,524 | * 10/1998 | Chen et al. | 709/203 |
| 5,838,927 | * 11/1998 | Gillon et al. | 709/247 |
| 5,928,330 | * 7/1999 | Goetz et al. | 709/231 |
| 5,928,331 | * 7/1999 | Bushmitch | 709/231 |
| 5,956,729 | * 9/1999 | Goetz et al. | 707/104 |
| 6,029,200 | * 2/2000 | Beckerman et al. | 709/226 |

\* cited by examiner

*Primary Examiner*—David Wiley
(74) *Attorney, Agent, or Firm*—Marsh Fischmann & Breyfogle, LLP

(57) ABSTRACT

An adaptable communication system provides capability to change the format of multimedia files being transmitted over a data network in real-time. Incorporated into a network server is a processor and other functionality for downloading multimedia files and then recreating the files to accommodate different download formats. A file may be created that is appropriate for real-time playing for a 14.4 k modem connection as well as an high-bandwidth line, such as an ADSL line connection. A separate file is created in the network server for these different type of connections. Also incorporated into each of the newly created multimedia files are reference marks which are located at the same playing interval for each of the files. Once a system user has accessed and is viewing a multimedia file as it is being downloaded, an interface connection may detect that noise or other problems on the network are decreasing the quality of the playback. Once this occurs, a different file may be retrieved from memory which is more appropriate for that transmission medium. The processor uses the reference marks included in each of the multimedia files to make a seamless replacement of one file for the other.

13 Claims, 5 Drawing Sheets

METHOD AND APPARATUS FOR OPTIMIZING PLAYBACK OF MEDIA FILES OVER A DATA NETWORK

FIELD OF THE INVENTION

The invention relates to the transmission of multimedia files over a data network, and more specifically to optimizing the transmission of multimedia files in order to provide real-time playback.

BACKGROUND OF THE INVENTION

As personal computers have become more sophisticated, the functions they perform have become more varied. Software now exists which allows computer users to view video clips or listen to sound recordings. Before the multimedia information may be played on a computer this information must first be stored in multimedia computer file which is recognized by the software. Some examples of formats for multimedia files are moving pictures expert group (MPEG) for video encoding and decoding, and musical digital interface (MIDI) for encoding and decoding audio data. These multimedia files are uploadable to a computer, and once loaded, are playable by the software resident on the machine.

Frequently, these multimedia files require a significant amount of memory, which may make them cumbersome for transmitting over data networks. One solution has been to use compression software for the transmission of these files. Prior to transmission, the file is converted to a compressed format. After the files is transmitted, the receiving computer decompresses the information and the file is ready to be played.

A desirable feature when downloading multimedia files may be to either view or listen to the information in real-time. Difficulties may be encountered when trying to perform this multimedia streaming function due to the quality of the connection established between apparatus transmitting the multimedia file and the apparatus which receives and plays it. As is well known, there are a variety of ways to access information through the Internet. Connection possibilities may range from a 14.4 k baud modem connection over a phone line with an Internet service provider (ISP), to a local area network (LAN) with an direct high-speed connection connection to the worldwide web. When making a direct comparison of the two examples recited, the LAN connection to the worldwide web has greater capacity to receive and transmit information.

The type of connection established for playing multimedia files has an effect on the quality of the presentation. If there are too many frames per second being transmitted for a particular type of connection, a certain amount of the data may be lost during transmission which affects the continuity as well as the resolution of the presentation. In situations where the data content of the multimedia files is too great for the type of connection established, it may not be feasible or possible to upgrade the connection.

SUMMARY OF THE INVENTION

Accordingly, a primary objective of the invention is to provide an apparatus and method providing adaptable multimedia streaming over a data network.

In addressing this objective the present inventors have recognized that although many compression schemes currently exist or multimedia streaming over a data network, none of these system provides the adaptability to allow a system user to select a particular transmission speed for the uploading of a multimedia file. Further, it has been recognized a number of factors, such as network congestion, may affect the quality of the transmission at different times.

The invention described herein is an adaptable communications system for streaming multimedia files and allowing their playback in real-time. The communications system may be incorporated into a network server which is part of a data network such as the worldwide web. The system user may access information on the server through a connection established on a network node. Through the connection established to the data network, the system user may download multimedia files which are stored on the network server. Technology currently exists for playing of some multimedia files during download. This is better known as multimedia streaming. One problem which may be encountered during streaming is that the configuration of the multimedia file may not be compatible with the connection established by the system user. If this connection is not compatible with the file format, the real-time playing of the file may lack a good quality continuity or resolution.

The network server may include a number of components, including a network interface, which provides for the two-way transmission of information between the network server and the data network. Connected to the network interface is a processor. This processor coordinates all internal functions for the network server. Also included in the network server is an interface monitor which monitors the transmission of information from the network server. A file compression module provides for the compression of files which are downloaded from the data network. A memory is provided which, under direction of the processor, is used to store the compressed files.

In one aspect of the invention, the network server first downloads multimedia files from a remote source. According to this process, these files may be downloaded from system user with network access, another network server, or any other device which provides this functionality that is connected to the data network. As the multimedia files are downloaded from a remote source, the systems incorporated in the network server perform two functions. The first function is to create multiple copies of the multimedia file in a variety of different formats. These different formats facilitate the transmission of the multimedia files to remote system users through a variety of different data network connections. For example, multimedia files may be generated for transmission especially through a 14.4 k baud modem connection, a 28.8 k baud modem connection, high-bandwidth line, such as an ADSL lines, as well as through a backbone connection. The creation of files in this manner takes into account the resolution and continuity which can be maintained during transmission over these connections.

Each multimedia file generated may include reference markers positioned at predetermined points in time during the playing of the multimedia file. For example, a reference mark may be placed at every minute mark in each file. The only requirement is that each multimedia file generated in the different formats has the reference markers placed at the same point along the time line. The second function which may be carried out by the network server with respect to the multimedia file is to compress each file and store it in memory. Upon storage, each file may be marked according to the criteria from which it was created.

The compressed files in the memory of the network server may be accessible by a system user through the data network. The different selections for multimedia files may be presented on a web page or other similar means. Upon accessing the network server and viewing the options, the system user may make a selection of both the multimedia file to be played as well as the connection speed through which it will be played. Upon receiving these instructions, the processor retrieves the appropriate file from the memory and begins to transmit the compressed filed over the data network. The system user may then play the file as it is downloaded.

As the selected multimedia file is being transmitted from the network server, the network interface monitors the streaming of the data. The transmission speed is directly related to the quality of the connection established by the system user. If the actual transmission speed does not match the transmission speed chosen by the system user, the processor for the network server uses this information to select a file from memory which better operates at the desired speed. In order to provide a seamless presentation, the processor, while outputting the original multimedia files, searches for the next reference mark. When the reference point is located, the processor then locates that same reference mark in the replacement file. When the playing of the multimedia files reaches the identified reference point, the processor will exchange the original file with the replacement file and resume transmission. If further noise or distortion disrupts the transmission of the replacement multimedia file, and the same process as described above may be performed again to find a multimedia file which is better suited for transmission over the connection.

Numerous modifications and additions will be apparent to those skilled in the art upon further consideration of the invention.

DETAILED DESCRIPTION

Figure 1:
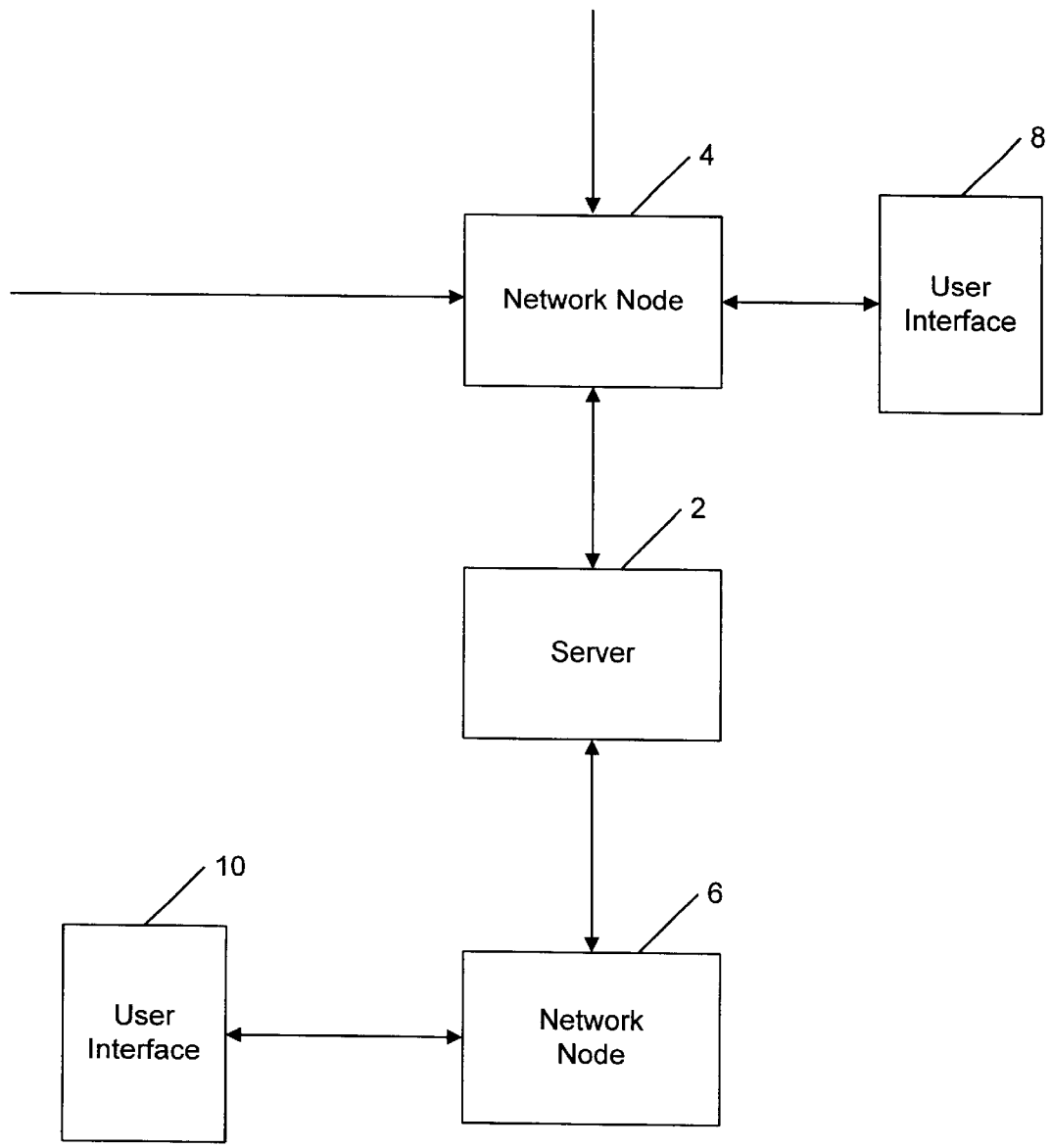
FIG. 1 discloses a portion of the data network in which a network server is incorporated.

Disclosed in FIG. 1 is a system diagram for a portion of a data network which incorporates the invention described herein. The data network may be the worldwide web or any other type of node-based network. In the portion of the data network shown in FIG. 1, network server 2 is in connection with other nodes in the network, specifically network node 6 and network node 4. System users may establish a connection to the data network through the various network nodes. The network nodes may be other network servers, some of which are controlled by Internet service providers which provide access to the worldwide web for remotely located system users. The network servers may also provide access to the worldwide web for system users connected to the server as part of a local area network (LAN).

User interfaces 8 and 10 may be personal computers which include software for playing multimedia files. It is well known in the art that video and audio information may be stored as a data file which, when loaded into the appropriate software, is playable over a user interface. These multimedia files are transferable over the data network between the various user interfaces, the network nodes, and the servers. These files can be stored on a server and downloaded and played by a system user. One mode of operation is for the system user to download the entire file onto a local storage device and then once this is complete, execute and play the file with multimedia software. Software now exists for real-time playing of the multimedia files during the download from a remote source. A problem which may be encountered during the real-time playing of multimedia software is that connections established between the user interfaces and the network nodes are of differing quality and the speeds and amounts of information which can be transmitted can vary greatly. For example, one user interface may be connected to the data network through a 14.4 k modem which has very limited capabilities for the transfer of information. Another user interface may be connected to the data network through an high-bandwidth line, such as an ADSL line which has a large capacity for the transfer of information. In either case, if the multimedia file is not in a format which is compatible with the type of connection established, the multimedia information will not play properly in real-time, or it will lack the best resolution possible for the type of connection established.

Figure 2:
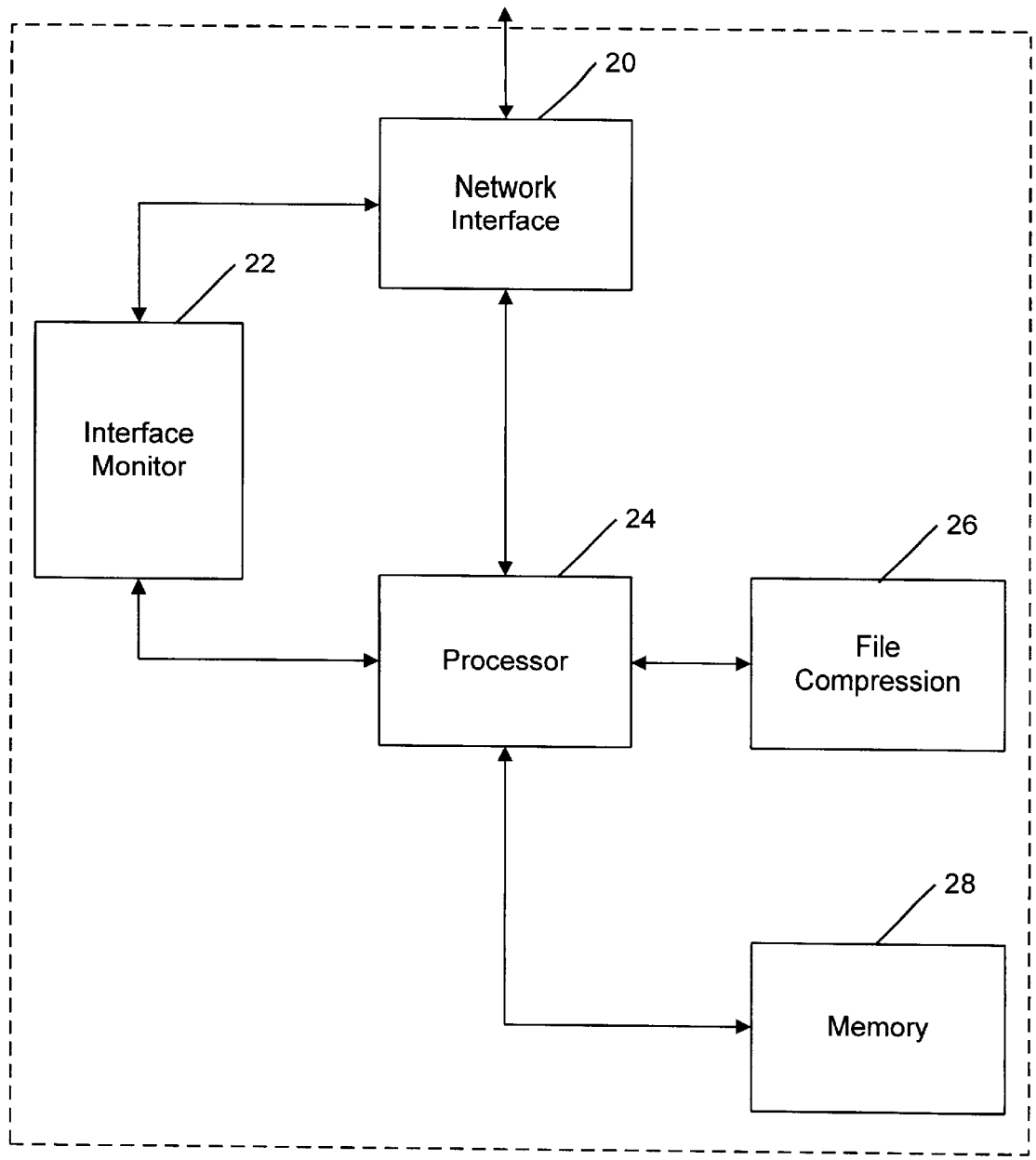
FIG. 2 discloses an internal system diagram for the network server.

Described in FIG. 2 is an internal system diagram for the network server 2. This server may of type which are currently commercially available, and which include the capability to perform a variety of data processing functions. Communication between the data network and the internal components of the network server are controlled through network interface 20. In connection with the network interface is processor 24 which controls the internal functions for the network server. These functions include the receipt and transmission of information, the retrieval and storage of files in memory, as well as compression of multimedia files. In connection with the network interface 20, is interface monitor 22. This monitor provides feedback as to the actual transmission speed for electronic data transmitted from the network server.

Also in connection with processor 24, is file compression module 26. This file compression module compresses the multimedia file so that they may be transmitted over the data network in a more expedient manner. The file compression module may incorporate any of a number of file compression programs commercially available. Files created through the compression module may be stored in memory 28. The processor 24 may also retrieve any information stored in memory and transmit it over the network.

Figure 4:
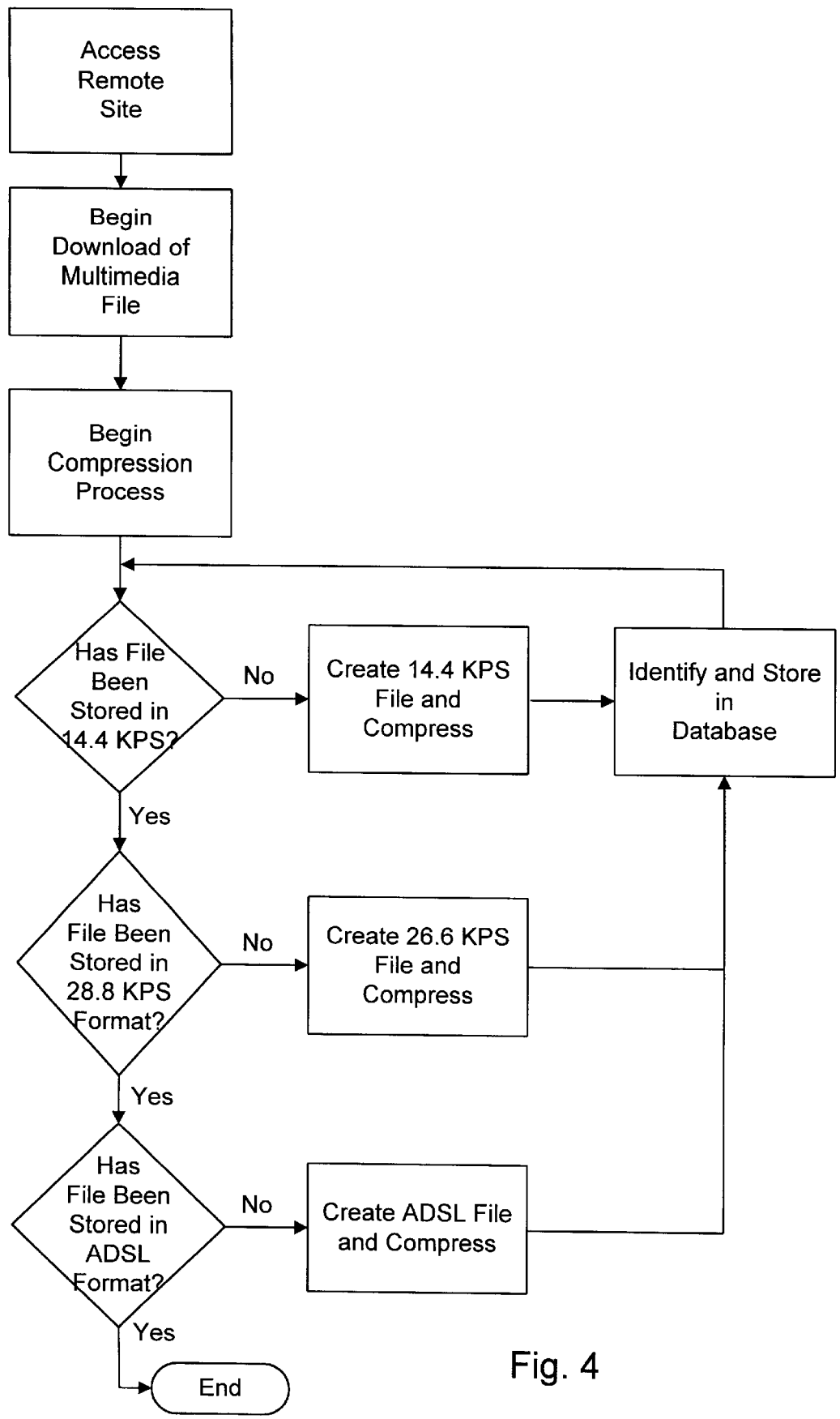
FIG. 4 discloses a flow diagram which describes the downloading and creation of multimedia files.

Before access may be provided to the various multimedia files, the network server must first receive these files from another source. As is typical in a data network, such as the worldwide web, multimedia files can be downloaded from a variety of sources including the various servers connected to the network. The format of the multimedia files downloaded may be of many different types. For example, there are many different formats for creating video files. The same can be also said for audio multimedia files. The processor incorporated in the network server includes the functionality to identify a variety of different multimedia formats. Once the format has been identified, the processor further includes the ability to generate copies of the multimedia files and amend the format of these copied files for transmission over a variety of different connection made to the network server. The procedure for downloading and copying the multimedia files is described in greater detail in the flow chart of FIG. 4.

To begin this process, a remote site which contains the multimedia file is accessed. The multimedia file is downloaded and the processor identifies which format the file has been created in. At this point, the processor begins the task of creating copies of the file in different transmission formats. Stored in memory are a listing of formats to convert the files to. In the example described herein, the formats may be 14.4 k baud modem, 28.8 k baud modem, and ADSL format. One skilled in the art would know that many additional formats are possible for transmission of multimedia files. The inclusion of just three formats is for descriptive purposes only, and is not meant as limitation on the scope of invention.

In the first step, the query is made as to whether a 14.4 k baud modem compatible file has been created. If the file hasn't been previously created, the processor will then make a copy of the multimedia file and then modify it such that it is compatible with the transmission medium. The file is then sent to the compression module where it is compressed, labeled and then stored in memory. At this point, the query is then made as to whether there is a 28.8 k baud modem compatible file in memory. If there is not, this file is created by the processor, compressed by the compression module, labeled, and then stored in memory. Finally, the query is made as to whether this multimedia file exists in an ADSL format. If it does not, the processor copies and converts the multimedia file to this format, the file is then transmitted to the compression module where it is compressed, labeled, and then stored in memory. Once files have been created in all the desired formats, the file creation process is complete.

In creating multimedia files that are compatible with different types of connections, the main formatting concern is the number of frames which may be transmitted during a particular time period. Because a connection such as a 14.4 k modem have limited ability to receive information, the files created for this connection will have a reduced frames per second rate of transmission. Although this affects the resolution of the media being played, it allows for playing of the information in real-time with better continuity. As the speed of the connection increases, files with a higher frames per second rate may be transmitted.

Figure 3A:
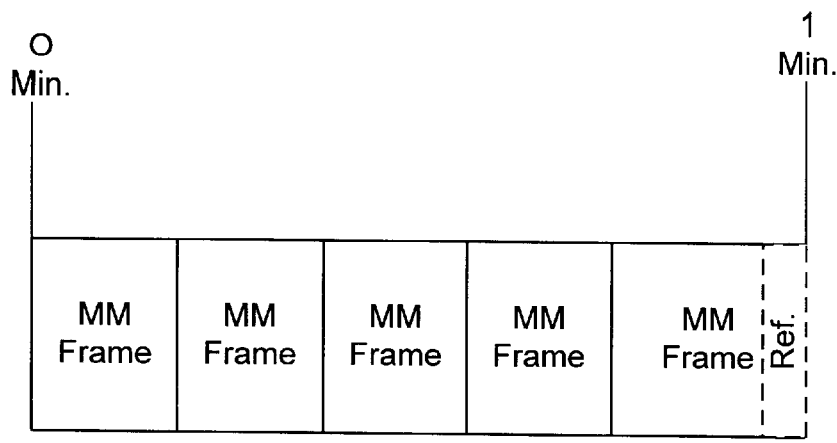
FIGS. 3a and b disclose representations of portions of the multimedia files including reference marks.
Figure 3B:
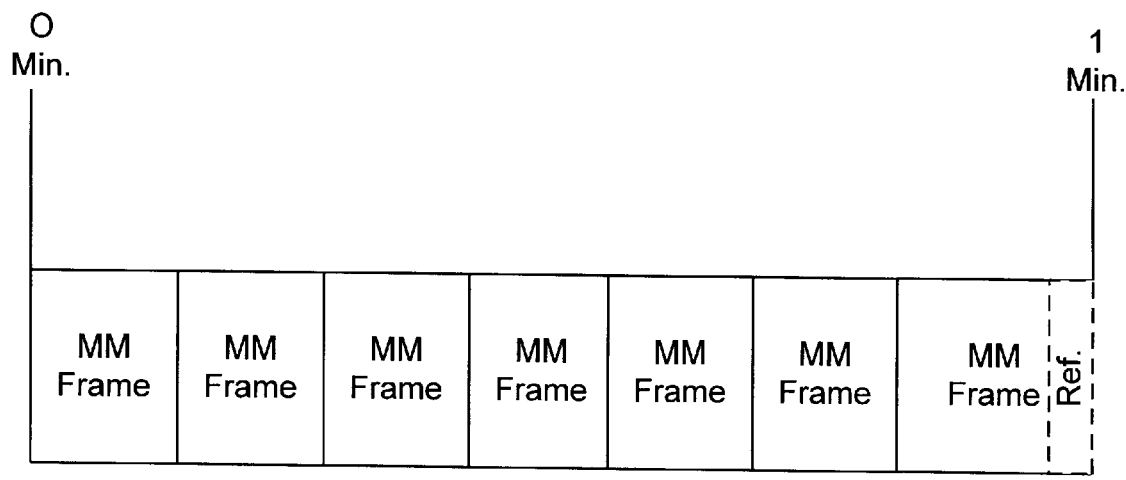

When the different multimedia files are created, one feature which may be incorporated therein is a reference marker positioned at particular points in time during the playback of the clips. For each file created from an original multimedia file, the reference markers are positioned at the same points. Shown in FIGS. 3a and 3b are representations of small portions of multimedia files stored in different formats. As an example, assume that the file in FIG. 3a is for a 14.4 k baud modem transmission and the file in 3b is for transmission over a high-bandwidth line, such as an ADSL line. For each of the multimedia files, a reference marker is placed at the one minute mark for real-time playback of the file. As one can see, there are many more multimedia frames between the zero minute mark and the one minute mark in the ADSL file of FIG. 3 than there are in the 14.4 k baud modem file of FIG. 3a. The main difference in the creation of the different formats is the resolution (band width) which is possible over the particular transmission medium.

Once all of the files have been created and stored in memory, they are available to a system user who has access to the network server for downloading. One procedure for downloading these multimedia files may include the incorporation of a web page into the network server which system users may access. Once the web page is accessed, the system user is able to view summaries of the available multimedia files. The system user may then select a file to download.

Once a selection is made, the system user is given the option to choose the format of the file to be downloaded. In most situations, the system user is aware of the type of connection established between the computer and the data network and can best decide which file would work best for transmission.

Figure 5:
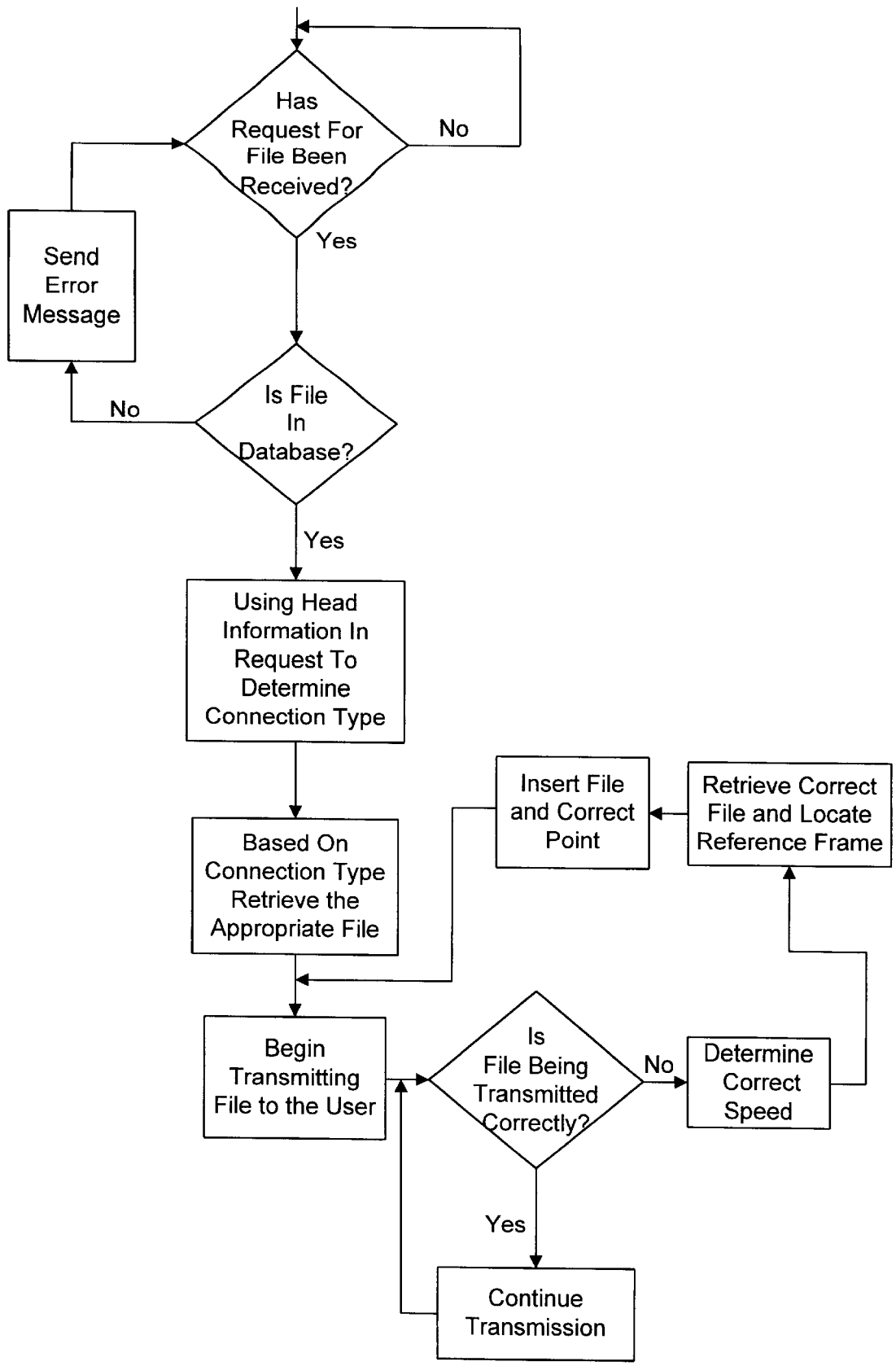
FIG. 5 discloses a flow chart which describes the transmission of selected multimedia file from the network server.

The procedure for downloading the multimedia files is disclosed in FIG. 5. To begin the process, a query is made as to whether the system user who has accessed the web page containing the multimedia file choices has made a selection. If the file is not in a database or some other problem is encountered, an error message is returned to the system user. If the file is in memory, the system user is provided with a second page in which a selection can be made for the format of the file to be downloaded. Once the system user has selected the desired file, the processor retrieves this file from memory and begins the download process. As was described above, the system user has multimedia software incorporated into the user interface for receiving and playing the compressed multimedia file in real-time.

During the time that the multimedia files are being transmitted to the system user, the transmission is monitored by the interface monitor 22. With this interface monitor, information is received back from the user interface as to how many packets of information are being received at the user interface, how many packets are being lost, and how many packets are then recoverable at the user interface. If during the monitoring of this process the packet recovery falls below a certain standard, or the connection is so good that it is possible to increase the band width transmission, the user interface will inform the processor of the particular situation. The processor, using this transmission information, will select from memory a multimedia file in a format which is more suitable for the transmission connection established. Once the correct file is identified, the processor locates the next reference frame in the multimedia file which is currently being transmitted. Once this reference frame is located, the identical reference frame is located in the replacement file. Once the reference frame is reached during the transmission of the original file, the processor replaces the original file with the new file in such a manner that the actual playing of the multimedia file at the user interface is not disrupted. Due to this change in files being transmitted, the performance and playability of the multimedia file should be improved. The interface monitor 22 continues the monitoring of the transmission throughout the duration of the entire file. The replacement of one file for the other can be done as long as reference marks still exist in the remainder of the multimedia file to be played.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described hereinabove are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A method for optimizing the transmission of multimedia files over a data network, comprising the steps of:

identifying a multimedia file to be played;

creating a plurality transmission files from the multimedia file where each of the plurality of transmission files is created in a format optimized for a particular transmission speed;

selecting a transmission speed and identifying one of the plurality of transmission files which is optimized for the transmission speed;

transmitting the identified transmission file;

periodically analyzing transmission characteristics of the identified transmission file during transmission of the identified transmission file to determine whether the identified transmission file is being transmitted at an optimum speed; and if the identified transmission file is not being transmitted at an optimum speed, determining an optimum speed for transmission;

identifying a different transmission file from the plurality of transmission files which is optimized for transmission at the optimum speed; and identifying a selected point during the transmission of the identified transmission file, and at the selected point, replacing the identified transmission file with the different transmission file and continuing the transmission with the different transmission file.

2. The method of claim 1 wherein common reference points are inserted in each of the plurality of files at predetermined intervals and these reference points are used to maintain continuity when the file being transmitted is changed.

3. The method of claim 1 wherein the multimedia file is video.

4. The method of claim 1 wherein reference frames are marked at a predetermined interval for each file in the plurality of transmission files.

5. The method of claim 1 wherein the multimedia file is audio.

6. The method of claim 1 wherein transmission speed corresponds to modem operating speeds.

7. The method of claim 1 wherein the data network is the world wide web.

8. An apparatus for optimizing playback of multimedia files over a data network comprising:

a processor which receives multimedia files from a remote source and converts the multimedia file into a plurality of transmission files each optimized for a particular transmission speed;

a memory connected to the processor for storing the plurality of transmission files;

a communication interface connected to the processor which provides for access and selection of the plurality of transmission files;

a transmitter which transmits one of the plurality of transmission files based on a selection received through the communications interface, wherein the one transmission file is optimized for a detected transmission speed over the data network; and, a monitor which monitors the transmission speed of the one transmission file and provides feedback to the processor when the one transmission file is being transmitted at other than optimum transmission speed, where the processor selects a different transmission file from the plurality of transmission which is optimized for transmission at the optimum transmission speed.

9. The apparatus of claim 8 wherein the apparatus is incorporated into a network server.

10. The apparatus of claim 9 wherein the data network is the world wide web.

11. The apparatus of claim 8 wherein the processor inserts reference markers in each of the plurality of transmission files at identical positions according to playing time.

12. The apparatus of claim 11 wherein the multimedia files are video and the reference points are incorporated through the marking of video at predetermined time intervals.

13. The apparatus of claim 11 wherein the multimedia files are audio and the reference points are incorporated through the insertion of markers at p redetermined intervals.

* * * * *